Oct. 16, 1962  M. MYERBERG  3,059,103
MAKE-UP MIRROR
Filed Aug. 7, 1961
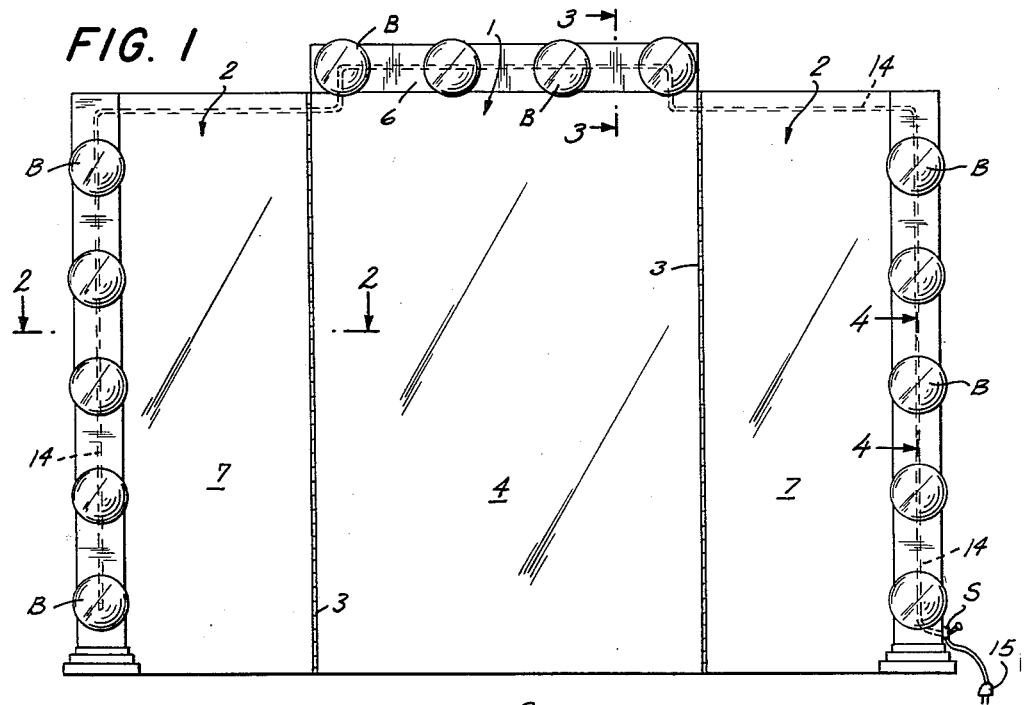
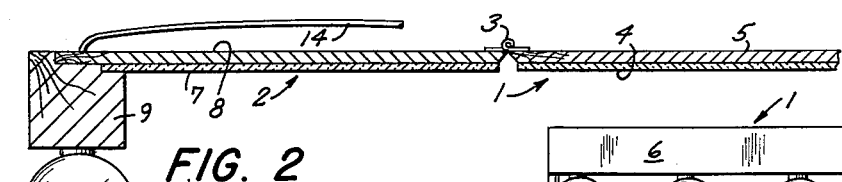
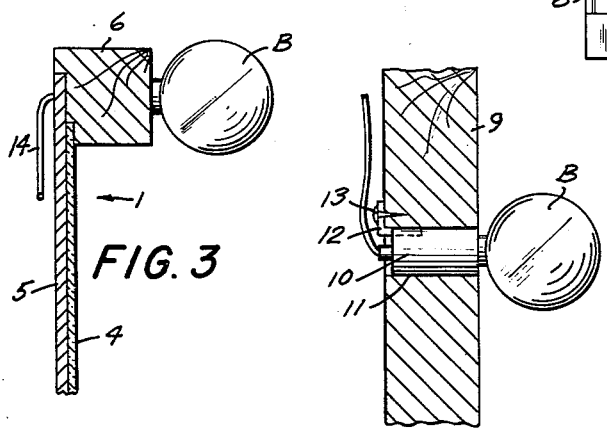
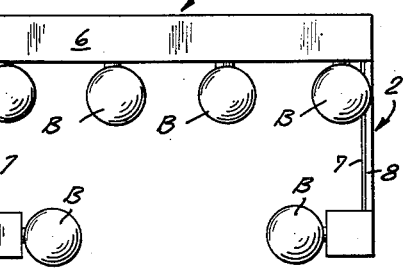
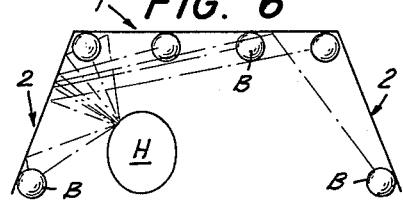
INVENTOR.
MICHAEL MYERBERG
BY
ATTORNEY

United States Patent Office 3,059,103
Patented Oct. 16, 1962

3,059,103
MAKE-UP MIRROR
Michael Myerberg, 234 W. 44th St., New York 36, N.Y.
Filed Aug. 7, 1961, Ser. No. 129,784
1 Claim. (Cl. 240—4.1)

This invention relates to make-up mirrors.

More particularly, the invention is concerned with make-up mirrors of the type incorporating illumination and having adjustment or being movable for obtaining the best angle of view and illumination for making up.

Make-up mirrors of this general type have not been adapted to both close and remote viewing and the glare and heat of the lights have been drawbacks, limiting the use of such mirrors. With incandescent light it has not been found possible to locate the light bulbs for optimum lighting while also avoiding danger of burning the face or hands in close make-up work. Fluorescent and other elongated bulbs operating with cooler surfaces do not provide either satisfactory quality or distribution of light.

It is the general object of the invention to provide a make-up mirror which is free from these defects.

With this and other objects which will appear in the following specification in mind, a make-up mirror embodying the invention in a preferred form will now first be described with reference to the accompanying drawing, and then be more particularly pointed out in the appended claim.

In the drawing:

FIG. 1 is a front elevation view of a make-up mirror embodying the invention in a preferred form;

FIG. 2 is a section on the line 2—2 of FIG. 1;

FIG. 3 is a section on the line 3—3 of FIG. 1;

FIG. 4 is a section on the line 4—4 of FIG. 1;

FIG. 5 is a plan view of the mirror of FIG. 1, with the panels in a different position;

FIG. 6 is a schematic plan view showing some of the reflection paths with the panels in a normal operating position.

The mirror shown by way of example in the drawing has a central panel 1 and side panels 2 joined to it by hinges 3, so as to permit opening the structure out flat (FIG. 1), placing the panels 2 at about right angles to the center panel 1 (FIG. 5) or in any intermediate position (FIG. 6).

Center panel 1 comprises a mirror 4 supported on a backing 5 of plywood or other suitable material and a head 6 (FIG. 3), secured to the backing 5 and mirror 4 and carrying a horizontal row of light bulbs B.

Each side panel 2 similarly comprises a mirror 7 and plywood or other suitable backing 8, the outer edge of each panel 2 being secured to a post 9 as shown in FIG. 2 and carrying a vertical row of bulbs B.

The bulbs are mounted on the posts 9 and head 6 as shown in FIG. 4 by means of sockets 10 fitting in bores 11 in the members 6 and 9 and secured to those members by angle irons 12, screws 13. Flexible cable or cord 14 connecting the bulbs B in parallel, as usual, runs up the left post 9, across head 6, down right post 9, through switch S to plug 15 or other connection.

The bulbs B are low wattage bulbs, substantially 15 watts per bulb being suitable, and are spaced substantially one bulb diameter apart. The bulbs are bare, which is an important feature in obtaining optimum illumination, and are of large diameter in relation to their wattage (2¼ inches in the mirror shown by way of example), and provide about one square inch of bulb surface for each three watts. This ratio is important, as the spacing of the bulbs from each other, the surface temperature, the maximum concentrated light and the total light are all important. Since the bulbs are used bare, it is important that they be made of glass and have coatings which diffuse the light and it is preferred to use bulbs with an external matte diffusing coating over the glass. It is found that such bulbs in the dimensions and wattage specified will not burn the face even though brought in direct contact with the bulb surface.

As is apparent from FIG. 6 taken in conjunction with the other figures, the illumination afforded by the mirror of the invention is of a complex character. There is represented there an oval H which might correspond generally to a human head and the illumination of the area thereof is indicated by lines. It will be apparent that the given area in the position specified is illuminated directly by all the bulbs carried by the left hand post and not only directly but by reflection from the left hand side mirror and that it is also illuminated by the bulbs in the area across the top of the central mirror, in some cases directly and in others only by reflection. In addition to this, even the right hand side mirror bulbs add some slight illumination to the area indicated. There is thus a combination of direct single and multiple reflected lighting from a large number of bulbs over each area of the face, the light coming from the different bulbs by their different paths arriving at different angles and being of different intensity. The light from all the bulbs having substantial lighting effect on any area, combines giving an exceptional diffuse illumination and substantially shadowless lighting. Since the area in question will be viewed along a path almost at right angles to one of the mirrors, or along a composite path starting from the eye location, there will be substantially no glare. Should the user look directly at one of the bulbs, the light intensity of any such bulb is so low that no objectionable glare effect is observed.

What is claimed is:

A make-up mirror comprising a central mirror panel, side mirror panels hingedly joined thereto, a row of electric light bulbs along substantially the entire outer edge of each side panel and along substantially the entire top edge of the central panel, and being positioned in spaced relation to the planes of the mirror panels and in front thereof for illuminating the face of a user by reflection from the said mirror panels as well as by direct lighting and being also positioned to permit bringing the face as close as desired and including even actual contact with said bulbs, the said bulbs being comparatively low wattage and large surface incandescent bulbs and having a smooth exterior light diffusing coating, whereby a substantially shadowless illumination for the face of the user is provided without danger of burning if the face is brought into contact with one of said bulbs, the said bulbs being substantially 15 watt bulbs, substantially 2¼ inches in diameter with a ratio of surface area to wattage of about one square inch to three watts and being spaced apart in the said rows by a distance substantially equal to the bulb diameter.

References Cited in the file of this patent

UNITED STATES PATENTS

| 900,590 | Raymond | Oct. 6, 1908 |
| 1,014,853 | Russell | Jan. 16, 1912 |
| 1,765,242 | Reiter | June 17, 1930 |
| 1,868,104 | Hoegger | July 19, 1932 |
| 2,556,870 | Clark | June 12, 1951 |
| 2,973,451 | Plishker | Feb. 28, 1961 |